United States Patent [19]

Elrod, Jr. et al.

[11] Patent Number: 5,285,715
[45] Date of Patent: Feb. 15, 1994

[54] ELECTROHYDRAULIC SERVOVALVE WITH FLOW GAIN COMPENSATION

[75] Inventors: Alvon C. Elrod, Jr., Ventura; Robert C. Heagey, Canyon Country; Donald C. Muths, Lake Hughes; Larry L. Nichols, Valencia; Clyde E. Cobb, Lakeview Terrace, all of Calif.

[73] Assignee: HR Textron, Inc., Valencia, Calif.

[21] Appl. No.: 926,013

[22] Filed: Aug. 6, 1992

[51] Int. Cl.$^5$ .................. F15B 9/03; F15B 13/044
[52] U.S. Cl. ................... 91/361; 137/625.64; 137/625.65
[58] Field of Search ............ 137/625.64, 625.65; 318/624; 91/361

[56] References Cited

U.S. PATENT DOCUMENTS

| | | |
|---|---|---|
| 3,201,675 | 8/1965 | Curran et al. . |
| 3,821,625 | 6/1974 | Scholl . |
| 4,077,738 | 3/1978 | Keely et al. . |
| 4,336,745 | 6/1982 | Lund . |
| 4,466,337 | 8/1984 | Eiler ............................ 137/625.65 X |
| 4,471,280 | 9/1984 | Stack . |
| 4,513,782 | 4/1985 | Contartese et al. . |
| 4,658,908 | 4/1987 | Hannukainen . |
| 4,907,493 | 3/1990 | Bellanger et al. . |
| 5,012,722 | 5/1991 | McCormick ............... 137/625.65 X |
| 5,165,448 | 11/1992 | Handte ........................... 137/625.64 |

FOREIGN PATENT DOCUMENTS

842231 7/1981 U.S.S.R. ......................... 137/625.64

Primary Examiner—Gerald A. Michalsky
Attorney, Agent, or Firm—Robbins, Berliner & Carson

[57] ABSTRACT

An electrohydraulic servovalve including a tailoring circuit coupled to provide a predetermined input signal to the motor of the valve. The predetermined signal functions to control the flow of fluid from the valve to effect a desired result. The electrohydraulic servovalve includes a housing defining round flow ports with a spool valve for metering flow through the ports. The spool valve substantially overlaps the round flow ports. The tailoring circuit includes a plurality of amplifiers each of which has a different gain. A command signal is applied to the amplifier and the output from the amplifiers is summed to provide an input signal to the motor of the electrohydraulic servovalve.

4 Claims, 7 Drawing Sheets

ELECTROHYDRAULIC SERVOVALVE WITH FLOW GAIN COMPENSATION

BACKGROUND OF THE INVENTION

The present invention relates generally to electrohydraulic servovalves and more specifically to such a servovalve having gain compensation to provide operational characteristics desired for specific application to which the valve may be put. For example, only the compensation may be such as to linearize the flow characteristic thereof including substantially eliminating the deadband resulting from a substantial overlap condition and other non-linear flow characteristic inherent in a specific type of valve.

Electrohydraulic servovalves are well known in the prior art and are used in many applications. As is well known to those skilled in the art, such a servovalve converts electrical control signals into output hydraulic signals for application to a fluid motor for use in various applications. In such devices, it is usually desirable to have a flow gain characteristic which is substantially linear with respect to the application of input control signals. It is also desirable to have a minimum amount of leakage when the valve is in its null position. When the valve has these operating characteristics, a very small amount of applied input signal will initiate movement of the valve thereby opening the flow ports to allow flow of fluid therethrough. The deadband is eliminated typically by providing rectangular flow ports with precisely fitted lands which open and close those ports. There is thus provided a line-to-line lap fit of lands on a spool valve to rectangular flow ports which provide the elimination of the undesirable deadband as the spool passes through its null region. However, such line-to-line lap fit is also synonymous with high quiescent spool leakage. To overcome the spool leakage, one needs to extend the spool so that there is sufficient overlap between the spool and the rectangular flow port edge. When such occurs the leakage is reduced to substantially zero. However, under such conditions, the undesirable deadband is introduced.

In addition to the foregoing, to manufacture rectangular ports and provide line-to-line spool lap is extremely expensive requiring machining operations such as EDM as well as flow grinding and lapping to match the spool and flow port edges precisely.

Figure 1:
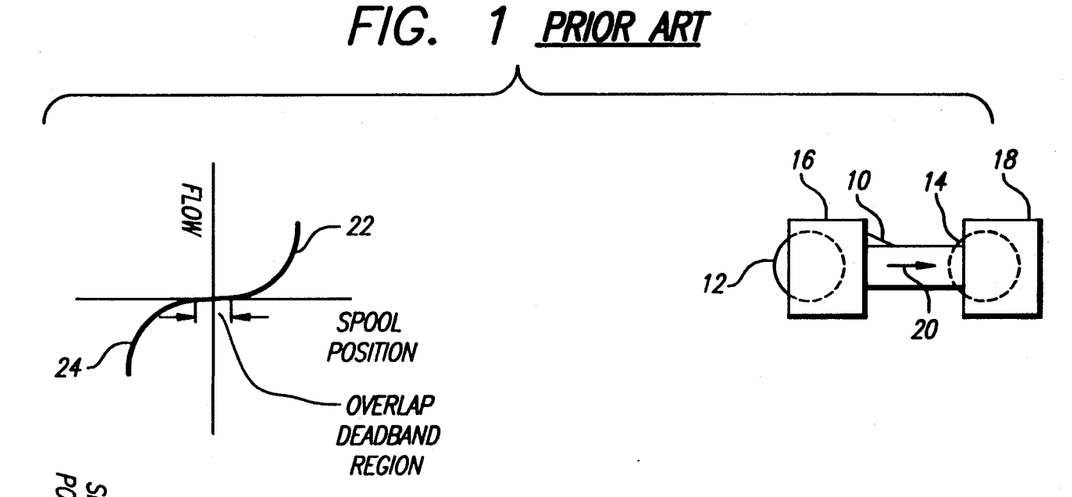
FIG. 1 is a curve showing flow versus spool position of a prior art round port valve as well as a sketch illustrative thereof.

In an attempt to reduce the cost of manufacture of such electrohydraulic servovalves, flow ports of different shapes than rectangular have been utilized from time to time. One such non-rectangular flow port is a round flow port. Such round flow ports are relatively easy to manufacture and do not require expensive machining operations. However, such flow ports with sufficient overlap to minimize leakage at the null position provide a highly non-linear flow gain curve of the type as is illustrated in FIG. 1. In FIG. 1, the flow is plotted on the ordinate with spool position on the abscissa (spool position being commensurate with input signal). As can be seen, there is a substantial deadband (effectively zero flow) about the center or null position of the spool. Even when flow does occur, it is relatively small compared to spool position since a round flow port when initially opened provides only a minimum amount of flow.

As a result, electrohydraulic servovalves having round holes for flow ports have, in the prior art, not been acceptable low cost alternatives to the rectangular flow ports with sufficient overlap to compensate for leakage.

In the prior art, to compensate for the deadband created by the substantial overlap there has been provided a control circuit which is used to modify the input signal causing the spool to shift rapidly out of the deadband range and thereby more closely approximate a linear flow gain. Such a device is shown in U.S. Pat. No. 3,821,625. As is therein disclosed, an operational amplifier has a near infinite gain so that an incrementally small input signal saturates the amplifier to produce a fixed maximum output voltage. This signal is coupled with the input control signal to sufficiently shift the valve to eliminate the spool overlap which causes the deadband. Although such compensation would assist in eliminating the deadband region as shown in FIG. 1, it would not eliminate other non-linearity characteristics of the flow versus spool position curve such as those created by round flow ports.

U.S. Pat. No. 4,513,782 discloses an electrohydraulic servovalve device designed to provide a desired linear flow in response to all possible electrical signals applied thereto. To accomplish this, the valve is tested at the time it is manufactured and deviations from linear are noted. An EPROM is then programmed to alter the applied electrical signals to overcome the deficiencies of that specific valve and provide a valve having a linear response. The EPROM becomes a permanent part of the valve.

SUMMARY OF THE INVENTION

An electrohydraulic servovalve including means to generate an electrical signal which is combined with a command signal for producing a predetermined output flow gain curve. The flow gain curve is determined by the particular application for the valve under its operating conditions.

DETAILED DESCRIPTION

As will become more fully apparent as the description of the invention progresses, the invention may be utilized for the purpose of tailoring the motor response to effect any desired output either from the EHSV (electrohydraulic servovalve) or apparatus connected to receive fluid flow therefrom. Such tailoring is accomplished by providing an electrical signal which is then further modified in the feed forward portion of the input circuit to the motor to thereby tailor the input signal to obtain the desired output. Alternatively, for valves with electrical spool position feedback signals such as direct drive valves, a signal may be provided by a sensor connected to the motor or to the spool which is connected to the motor which in turn provides the desired performance. This signal is then summed with the command signal in the direct drive valve controller to provide an input signal to the motor to accomplish the desired effect.

Figure 3:
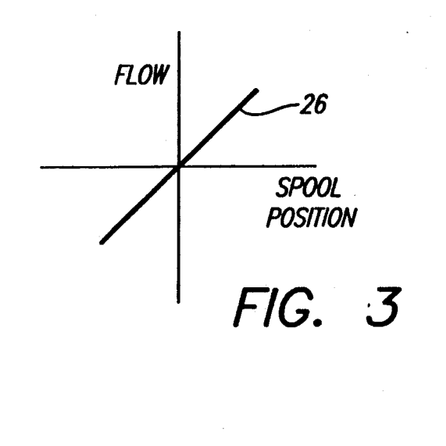
FIG. 3 is a linearized curve after application of the compensating signal of FIG. 2.

It will be understood by those skilled in the art that the shaping and tailoring of the electrical input signal is limited only by the applications to which the EHSV is to be put. It would be impossible to describe all such possibilities. Therefore, for purposes of clarity of illustration and ease of description, and as one specific embodiment of the present invention, an EHSV utilizing round-hole porting with substantial spool overlap will be described. Such apparatus is very schematically illustrated in FIG. 1 which includes a spool 10 and round-hole ports 12 and 14 with the lands 16 and 18 providing substantial overlap of the round ports 12 and 14. As is illustrated by the arrow 20, as the spool moves toward the right, the round port 12 commences to open and allow flow. As the spool is shuttled in both directions to its limit positions, flow occurs through each of the two ports 12 and 14. As a result of the configuration of the port and the substantial overlap, a flow versus spool position curve, as is shown in FIG. 1, results. Because of the overlap of the round ports 12 and 14 by the spools 16 and 18, a predefined movement of the spool 10 is required before any flow is permitted. This results in the overlap deadband region. As flow from the round hole port is allowed to occur, it is relatively low as the port is first uncovered and then rapidly increases to full flow as is shown by the upper portions of the curve, for example at 22 and the lower portion at 24. As is well known to those skilled in the art, the ideal flow versus spool position in many valves is a linear curve as is shown in FIG. 3. That is, as the spool moves in either direction, flow immediately starts and then progresses in a linear fashion as is shown by the curve 26.

Figure 6:
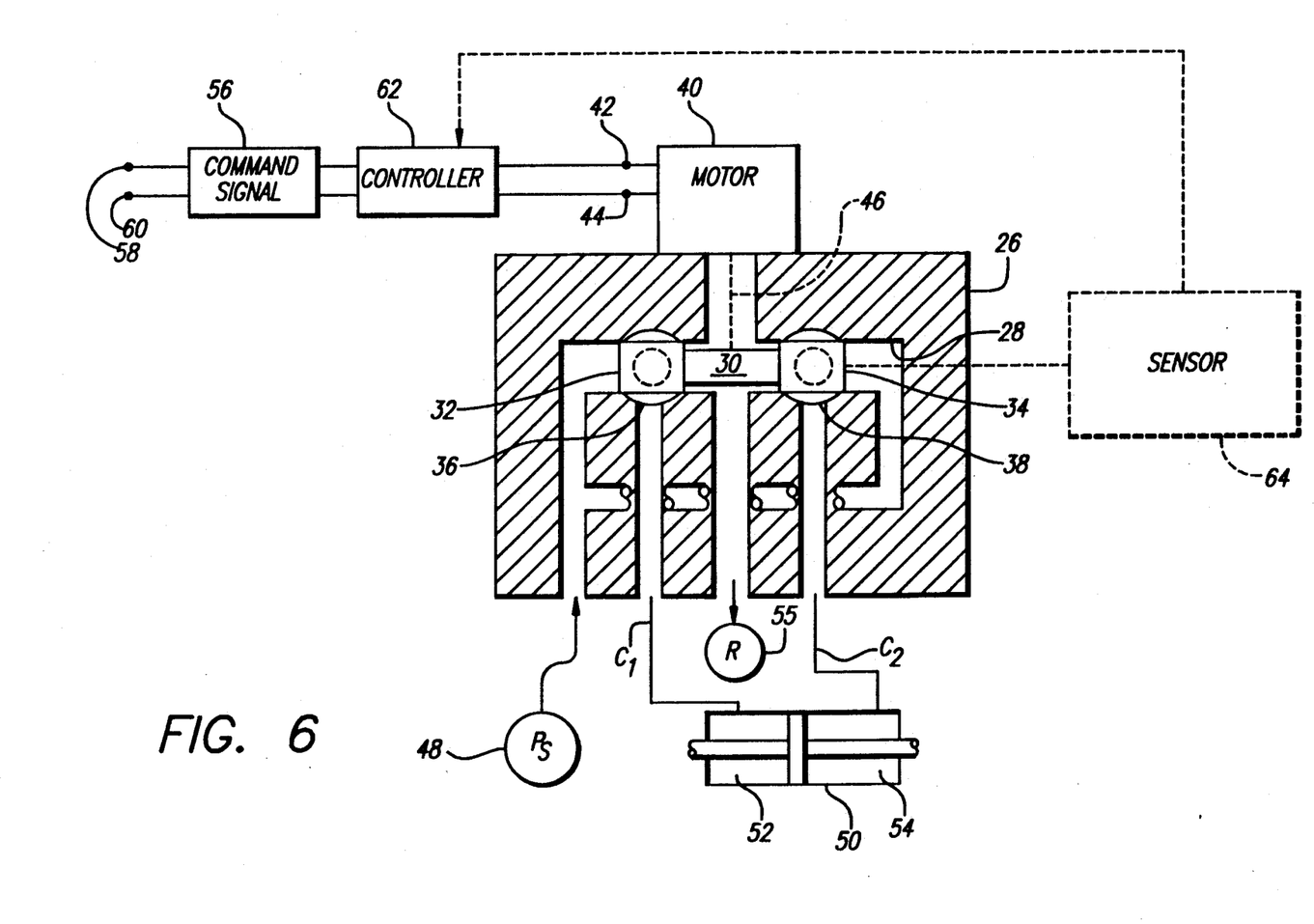
FIG. 6 is a schematic representation illustrative of a valve utilizing round flow ports.

Referring now more specifically to FIG. 6, there is schematically illustrated an EHSV having roundhole ports and which may be used as illustrative of the present invention. As is therein shown, a housing 26 defines a bore 28 within which is disposed a spool 30 having a pair of lands 32 and 34 which function to control the flow of fluid under pressure, such as hydraulic fluid, through flow ports 36 and 38 which are shown as round flow ports. The motor 40 is energized by electrical signals applied thereto by way of the electrical inputs 42 and 44. A motor 40 drives the spool 30 as is indicated by the interconnection 46 between the motor 40 and the spool 30. Fluid, such as hydraulic fluid under pressure, is applied from a source 48 through appropriate passageways as shown to opposite ends of the spool 30. As the motor causes the spool 30 to translate, fluid flows through either port 36 or 38 depending upon the direction of translation of the spool 30. The fluid flows through the outputs C1 and C2 to the actuator 50 connected thereto which in turn moves a load (not shown) as is well known to those skilled in the art. It is also well known that as fluid flows from C1 into the chamber 52 of the actuator 50 fluid flows from the chamber 54 through C2 and return to the system as shown at 55.

The electrical signal applied to the inputs of the motor 40 may emanate from a command signal generator 56 which may have applied thereto by way of terminals 58 and 60, input signals which may be from any source desired. The output from the command signal generator is applied to a controller 62 which operates upon the command signal to provide the desired tailoring of the electrical signal which is to be applied to the motor 40 to cause the EHSV to provide the desired output signal for the particular application under consideration. Alternatively, or in addition where a direct drive valve is used, a sensor 64, such for example as a linear potentiometer may provide a position output electrical signal which in turn is applied to the controller 62 for the purposes above described.

Figure 10:
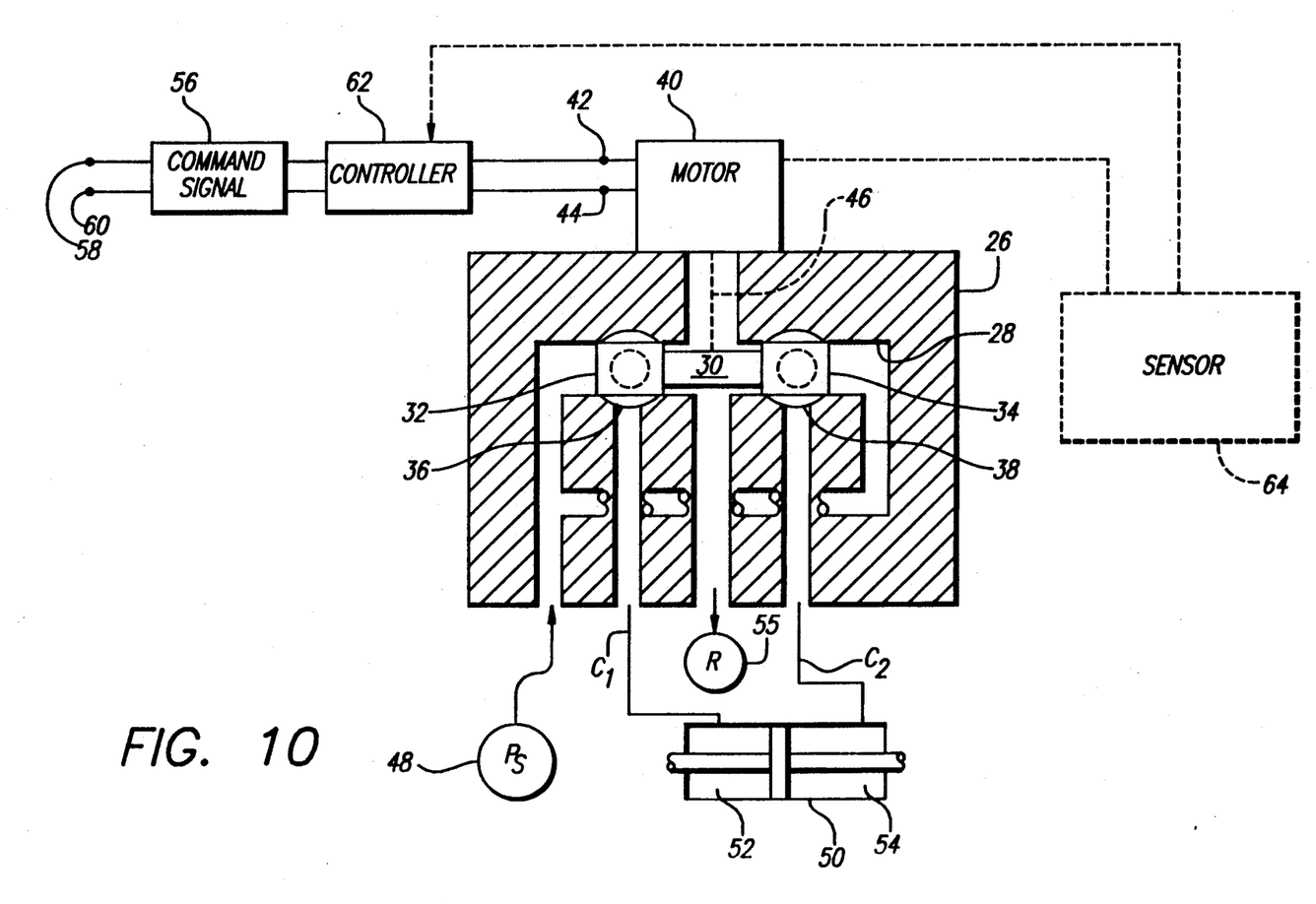
FIG. 10 is a schematic representation illustrative of a valve as shown in FIG. 6 but with the sensor connected to the motor.

FIG. 10 is illustrative of a valve such as that shown in FIG. 6 but with a sensor 64 connected to the motor 40.

Figure 11:
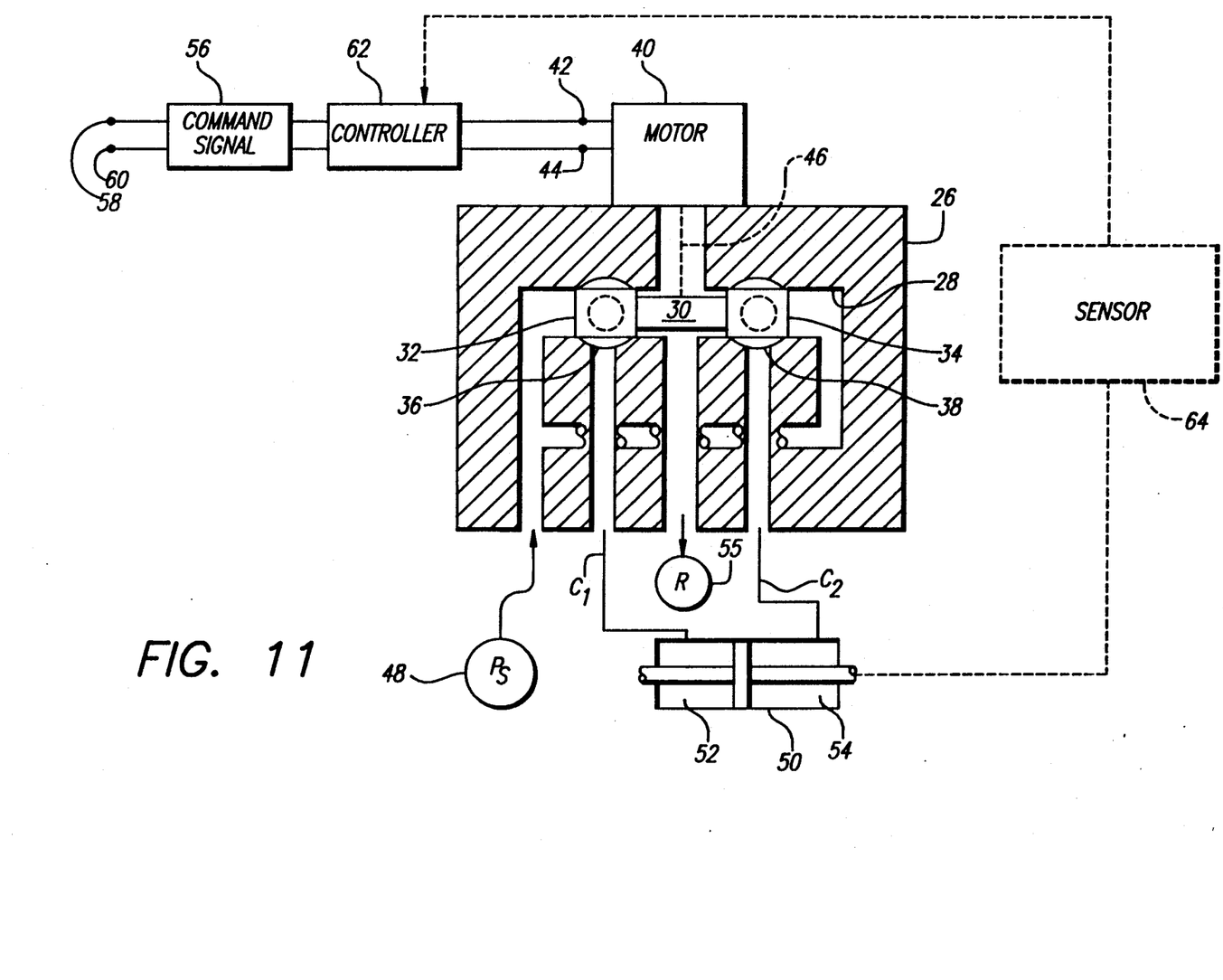
FIG. 11 is a schematic representation similar to FIG. 10 but with the sensor connected to the actuator.

FIG. 11 is a schematic diagram illustrative of a valve similar to that in FIG. 6, but with the sensor 64 connected to the actuator 50. The controller will include appropriate tailoring circuits as may be required.

Figure 2:
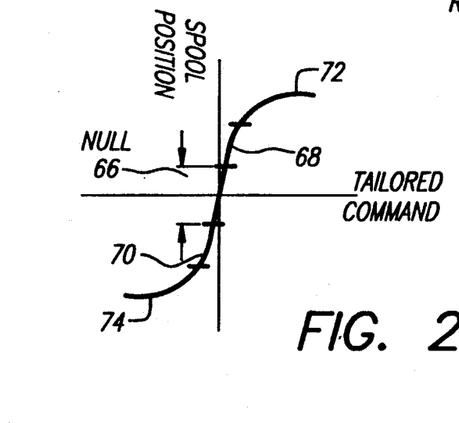
FIG. 2 is a curve showing the electrical feedback signal required to compensate for the flow curve of FIG. 1.

By referring now more particularly to FIGS. 1, 2 and 3, it will be understood that the structure as shown in FIG. 6, without the command and tailoring circuits, would provide the flow versus spool position curve as shown in FIG. 1 while it is desired to have the flow versus spool position curve as shown in FIG. 3. The present invention provides the desired tailoring in the controller 62 to provide an electrical signal of the type as illustrated in FIG. 2 to which reference is hereby made. As is therein shown, the tailored command signal which is applied to the terminals 42 and 44 of the motor 40 is plotted on the abscissa and the spool position is plotted on the ordinate. As is therein shown, a very high gain signal is applied at the null spool position. The high gain signal is to overcome the overlap deadband region. That is, as the high gain null signal is applied, rapid movement of the spool 30 occurs to essentially eliminate the deadband region where no flow occurs. Such is illustrated in the null region 66 in FIG. 2. Subsequent to movement of the spool 30, so that flow commences upon the application of any input signal to terminals 58 and 60 of the command signal generator 56, flow is shown to commence but as noted in FIG. 1, the flow is relatively small in amount. Therefore, an intermediate gain portion of the curve is provided as illustrated at 68 and 70 to overcome such low flow which would normally be expected from the device of FIG. 6. Subsequently, as the flow increases as shown at 22 and 24, the gain flattens out as shown at 72 and 74 in FIG. 2. Thus, essentially allowing the spool 30 to move as it normally would in response to a signal applied to the terminals 42 and 44 without tailoring. Application of the tailored command signal as illustrated in FIG. 2 to the motor 40 of the structure as shown in FIG. 6 causes the spool position normally expected to vary in such a way that if the tailored command signal as shown in FIG. 2 is ideal, the resulting flow curve would be linear as shown at 26 in FIG. 3.

Figure 4:
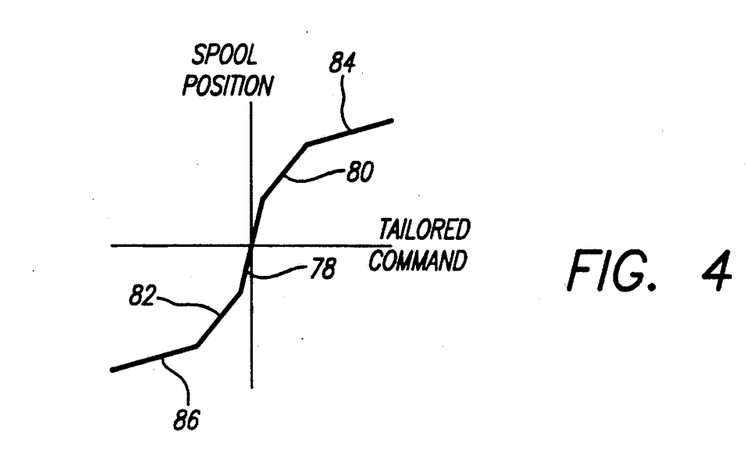
FIG. 4 is an electrical signal which may be generated utilizing on specific application which will approximate a linearized curve.

It will be recognized by those skilled in the art that in many instances it will be impractical, from an expense point of view, to provide a tailoring circuit capable of producing the ideal tailored command to the motor 40. An approximation to such a tailored command, however, is practical and inexpensively obtainable. Such a tailored command electrical signal is shown in FIG. 4. As is therein shown, the tailored command signal is plotted on the abscissa and the spool position on the ordinate. The tailored command signal as shown in FIG. 4 includes the very high gain region as shown at 78 which is used to overcome the overlap deadband region as shown in FIG. 1. An intermediate gain region is shown at 80 and 82 on the tailored command curve while a low gain region is shown at 84 and 86. The intermediate gain regions 80 and 82 are to position the spool so that flow from the round ports is caused to occur more rapidly than would otherwise be the case while the low gain regions 84 and 86 are to merely allow the normal flow which would occur since the round ports are substantially open at such a spool position.

Figure 5:
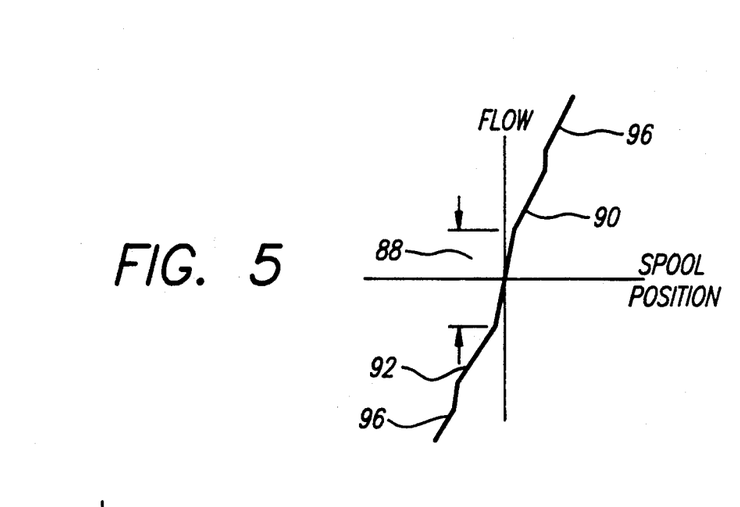
FIG. 5 is the flow curve resulting from the application of the electrical signal as illustrated in FIG. 4.

When the tailored command electrical signal as shown in FIG. 4 is applied to the terminals 42 and 44 of the motor 40, the resulting flow versus spool position curve is as shown in FIG. 5. As is therein illustrated, although the curve is not precisely linear as desired, a close approximation to such linearity is accomplished. In the original overlap deadband region around null, as is illustrated at 88, there is a substantially linear flow approximating the flow which would occur from a rectangular port with a very closely lap-fitted spool valve. In the intermediate flow regions shown at 90 and 92, the substantially low flow as seen in the curve at FIG. 1 has been substantially modified by the gain in the tailored command signal as shown at 80 and 82 to cause the flow to become substantially linear. The final portions of the curve at 94 and 96 again approximate linearity resulting from the low gain regions 84 and 86 of the tailored command signal as shown in FIG. 4.

Figure 7:
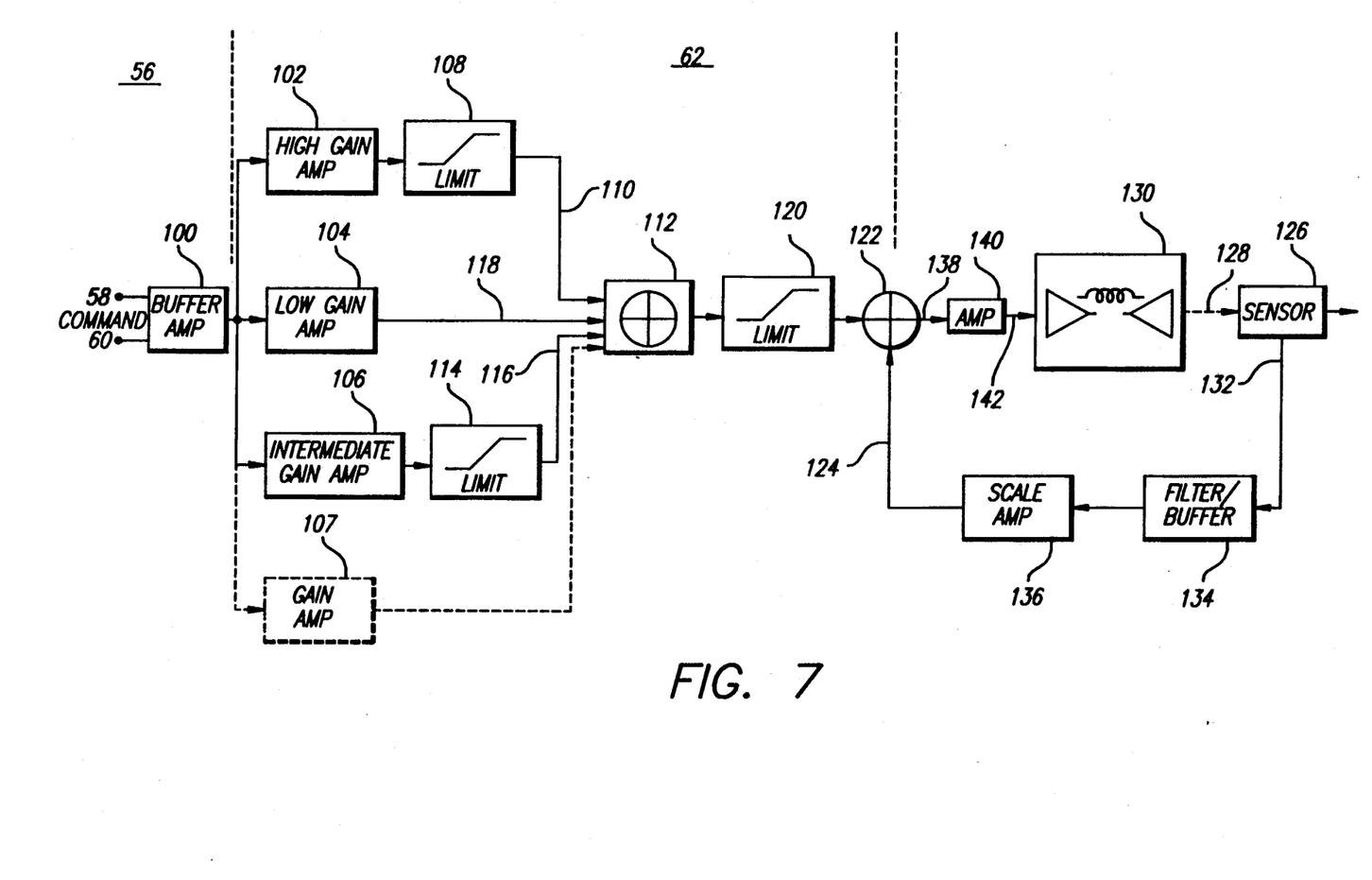
FIG. 7 is a block diagram illustrative of a system utilizing a round flow port with flow gain compensation.

By reference now to FIG. 7, there is illustrated a circuit which may be utilized to generate the approximate tailored command as shown in FIG. 4. As is illustrated in FIG. 7, the desired input signal is applied to the terminals 58 and 60 of a buffer amplifier 100. The output of the buffer amplifier is then applied to a plurality of amplifiers 102, 104 and 106. As is illustrated by the dashed amplifier 107 and the dashed interconnections thereto, any number of amplifiers may be utilized to generate the desired approximation to the ideal tailored input command signal for the particular application involved. However, for purposes of clarity and ease of description and illustration, only three amplifiers have been illustrated. In this particular instance, a high gain amplifier 102 is provided to generate the high gain portion of the signal as is shown at 78 in FIG. 4. That is, a relatively small input signal from the buffer amplifier 100 will be amplified with a substantial gain through the amplifier 102 to cause the spool 30 to immediately move from its overlap deadband region to cause fluid to commence to flow immediately upon the application of any signal. Since relatively high gain movement of the spool is required only to overcome the overlap deadband region, a limiter 108 is connected to the output of the high gain amplifier 102. When the output of the high gain amplifier 102 reaches a predetermined point, the output signal applied over the coupling 110 to the summing point 112 remains fixed irrespective of any increases in the command from the buffer amplifier 100.

The intermediate gain amplifier 106 is utilized to provide the intermediate gain regions 80 and 82 of the tailored command signal as shown in FIG. 4. Thus, upon application of an increasing signal from the buffer amplifier 100, the high gain output would be limited after a relatively small incremental increase while through the intermediate gain amplifier the signal would continue to increase but would also be limited by the limiter 114. Once limited, the output signal applied from the limiter 114 over the coupling 116 to the summing junction 112 would remain constant.

The low gain amplifier 104 is utilized to provide the low gain portions 84 and 86 of the tailored command signal as shown in FIG. 4. Therefore, irrespective of the continued increase of the command from the buffer amplifier 100, the low gain amplifier continues to amplify according to the gain associated therewith and the output signal is applied over the coupling 118 to the summing junction 112 without any limitation. In a similar fashion, in the additional amplifiers such as that shown at 107 may or may not utilize limiters and the output signals therefrom would also be applied to the summing junction 112.

The various signals applied through the amplifiers are summed at the summing junction 112 and an additional limiter 120 may be utilized if such is desired to preclude saturation of the motor 40 of the apparatus as is shown in FIG. 6. The output of the limiter 120 is applied to an additional summing junction 122. The other input over the coupling 124 to the summing junction 122 is the internal position feedback of the apparatus. Such feedback is provided through the utilization of a sensor 126 which may be coupled as shown by the dashed line 128 to any movable portion of the EHSV 130 as may be desired. For example, the sensor may be a linear potentiometer which is coupled to the spool 30 to sense its position. The output from the position sensor is applied by way of the coupling 132 to a filter/buffer amplifier 134 and then to a scaling amplifier 136 the output of which is then applied to the summing point 122. The tailored command signal and the position signal are compared to develop an error signal which is applied by way of the coupling 138 to the amplifier 140. The output of the amplifier is then coupled by way of the coupling 142 to the motor of the EHSV 130. It will be recognized that if the spool 30 is in the overlap deadband region, when a signal is applied to the terminals 58 and 60, it is amplified by the high gain amplifier 102 and a high gain signal as shown at 78 in FIG. 4 is applied to the motor because the sensor output indicates that the spool is in its null position. Thus, the spool 30 will immediately translate to a position to allow flow as is shown in the portion 88 of the curve on FIG. 5.

As above described, in some instances, it may be desired to provide an input command signal which in turn may be amplified and applied to the motor of the EHSV to provide the desired output. Such can be provided through the utilization of a shaped sensor such, for example, as a shaped potentiometer which will provide the desired output electrical signal depending upon the position of the spool in the EHSV. This signal may then be amplified and applied to the motor to cause the spool to move to the desired position to accomplish the linearized output flow in response to spool position as above described. Such a circuit is shown schematically in FIG. 8 to which reference is hereby made.

Figure 8:
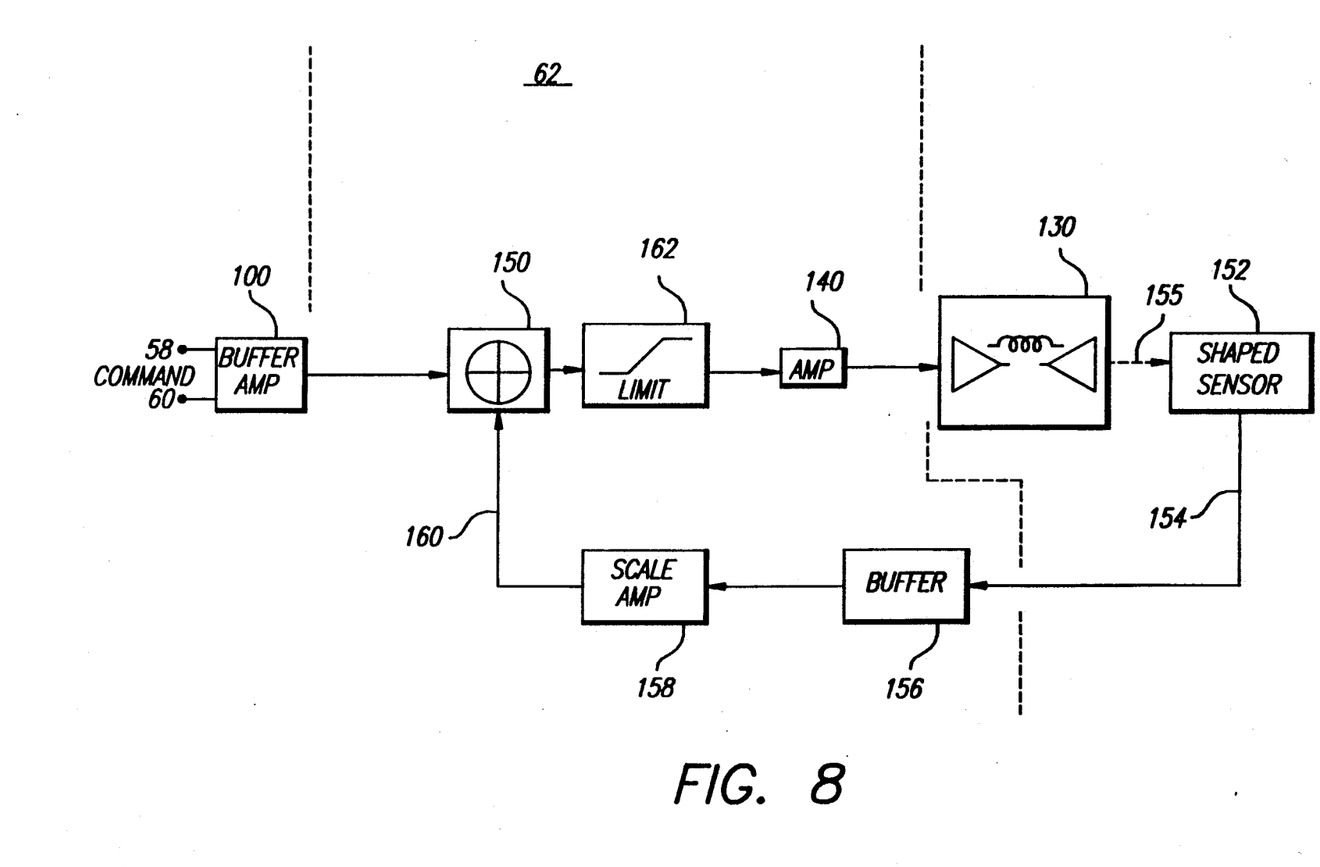
FIG. 8 is a block diagram illustrating an alternative system utilizing round flow ports and having flow compensation.

As is shown in FIG. 8, the normal command is applied through the buffer amplifier 100 with the output thereof being applied to the summing junction 150. The other input to the summing junction 150 emanates from a shaped sensor 152 which is connected, for example, as illustrated by the dashed line 155 to the spool 30 of the EHSV. The shaped sensor can be in the form of a tailored potentiometer which will provide the desired tailored command signal to the motor to provide the desired output flow therefrom. This signal from the shaped sensor 152 will be applied through the coupling 154 to a buffer amplifier 156 and to a scaling amplifier 158. The output of the scaling amplifier will be applied by the coupling 160 to the summing junction 150. The output of the summing junction will then be a signal which is tailored to accomplish the desired operation of the EHSV 130. The signal may be limited by the limiting apparatus 162, then amplified at 140 and applied to the motor 130.

Figure 9:
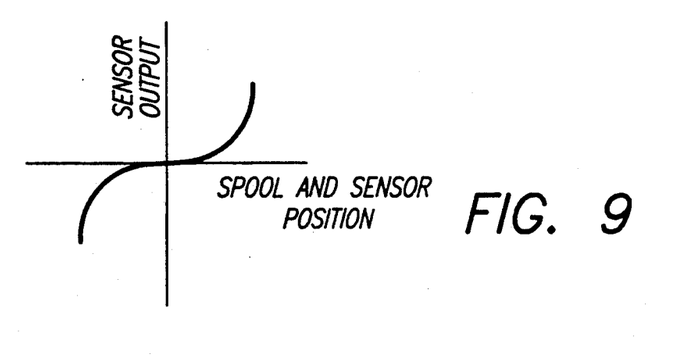
FIG. 9 is a curve illustrating the output of the shaped sensor as shown in FIG. 8.

The desired signal at lead 154 would be of the type as shown in FIG. 9. As is illustrated therein, the spool and sensor position is shown on the abscissa while the sensor output signal is shown on the ordinate. The sensor output signal when properly amplified and scaled will closely resemble the flow curve of FIG. 1. When applied to the controller and operated upon to form the input signal to the motor, the resultant spool position versus flow curve will be as shown in FIG. 3.

There has thus been disclosed an electrohydraulic servovalve which is coupled with an appropriate circuit to provide a tailored command signal thereto to obtain the desired output flow pattern as may be required for any particular application.

What is claimed is:

1. An electrohydraulic servovalve system having a motor responsive to electrical signals for positioning a valve member to control the flow of fluid therethrough, said valve includes round ports and said valve member overlays said round ports thereby providing flow characteristics including a deadband region, an intermediate flow region and a full flow region, said system comprising:
 a) a source of electrical command signals:
 b) means for receiving said electrical command signals;
 c) means coupled to said receiving means for tailoring said command signals and providing a tailored signal including a plurality of amplifiers, each of said amplifiers having a different gain, at least one of said amplifiers including means for limiting the output signal thereof;
 d) a first one of said amplifiers providing a first signal to compensate for said deadband region, a second one of said amplifiers providing a second signal to compensate for said intermediate flow region and a third one of said amplifiers providing a third signal to compensate for said full flow region;
 e) means for summing the output signals from said amplifiers,
 f) a position sensor coupled to said electrohydraulic servovalve system for providing an electrical signal representative of position;
 g) means for comparing said position signal and said tailored signal for developing an input signal to said motor; and
 h) means for coupling said input signal to said motor, whereby a substantially linear flow characteristic results.

2. An electrohydraulic servovalve as defined in claim 1 wherein said position sensor is coupled to said valve member.

3. An electrohydraulic servovalve as defined in claim 1 which further includes an actuator coupled to said servovalve and said position sensor is coupled to said actuator.

4. An electrohydraulic servovalve as defined in claim 1 wherein said position sensor is coupled to said motor.

* * * * *